(12) United States Patent
Adamson et al.

(10) Patent No.: US 9,292,114 B2
(45) Date of Patent: Mar. 22, 2016

(54) DUAL TOUCH SURFACE MULTIPLE FUNCTION INPUT DEVICE

(75) Inventors: Peter S Adamson, Portland, OR (US); Gary Paek, Beaverton, OR (US); Nicholas W Oakley, Portland, OR (US); John J Valavi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 13/485,633

(22) Filed: May 31, 2012

(65) Prior Publication Data

US 2013/0321287 A1 Dec. 5, 2013

(51) Int. Cl.
G06F 3/041 (2006.01)
G06F 3/048 (2013.01)
G06F 3/0488 (2013.01)
G06F 1/16 (2006.01)
G06F 1/32 (2006.01)

(52) U.S. Cl.
CPC .............. *G06F 3/041* (2013.01); *G06F 1/1616* (2013.01); *G06F 1/1671* (2013.01); *G06F 1/3259* (2013.01); *G06F 1/3271* (2013.01); *G06F 3/0416* (2013.01); *G06F 3/0488* (2013.01); *G06F 3/04886* (2013.01); *G06F 2203/04803* (2013.01); *Y02B 60/1253* (2013.01); *Y02B 60/1257* (2013.01)

(58) Field of Classification Search
CPC ............ G06F 3/041–3/047; G06F 3/0488; G06F 3/04886; G06F 1/16; G06F 1/1643; G06F 1/1684; G06F 1/169; G06F 1/1692; G06F 1/32; G06F 1/3262; G06F 1/3265; G06F 1/3287

USPC ................ 178/18.01, 18.03–18.11; 345/156, 345/173–178

See application file for complete search history.

(56) References Cited

U.S. PATENT DOCUMENTS

| | | |
|---|---|---|
| D358,376 S | 5/1995 | Poon |
| 6,459,424 B1* | 10/2002 | Resman ........................ 345/173 |
| 6,480,373 B1 | 11/2002 | Landry et al. |
| D565,045 S | 3/2008 | Wu et al. |
| D616,880 S | 6/2010 | Andre et al. |
| D631,043 S | 1/2011 | Kell et al. |
| 7,885,431 B2* | 2/2011 | Kim ...................... G06F 1/3203 345/156 |
| 7,999,792 B2 | 8/2011 | Tsuji et al. |
| D649,544 S | 11/2011 | Chiu et al. |
| D658,171 S | 4/2012 | Masui et al. |
| D660,835 S | 5/2012 | Cheng |
| D674,793 S | 1/2013 | Chen et al. |
| D691,995 S | 10/2013 | Adamson et al. |
| D694,232 S | 11/2013 | Adamson et al. |

(Continued)

OTHER PUBLICATIONS

Non-Final Office Action in U.S. Appl. No. 13/485,690 mailed on Feb. 19, 2014.

(Continued)

*Primary Examiner* — Nathan Danielsen
(74) *Attorney, Agent, or Firm* — Patent Capital Group (57) ABSTRACT

For one disclosed embodiment, an apparatus includes a first housing and a touch input device supported by the first housing. The touch input device includes a first touch surface layer, a second touch surface layer, and a touch sensor disposed between the first touch surface layer and the second touch surface layer. The touch sensor is configured to detect a first touch input associated with the first touch surface layer and a second touch input associated with the second touch surface layer.

29 Claims, 8 Drawing Sheets

(56) References Cited

U.S. PATENT DOCUMENTS

| | | | |
|---|---|---|---|
| D698,350 S | 1/2014 | Adamson et al. | |
| D698,778 S | 2/2014 | Adamson et al. | |
| D701,501 S | 3/2014 | Adamson et al. | |
| 2005/0135053 A1* | 6/2005 | Carroll | 361/683 |
| 2005/0243783 A1 | 11/2005 | Lee et al. | |
| 2007/0120762 A1 | 5/2007 | O'Gorman | |
| 2008/0150903 A1 | 6/2008 | Chuang | |
| 2008/0309640 A1* | 12/2008 | Hong | G06F 3/04886 345/173 |
| 2009/0179859 A1 | 7/2009 | Wisebourt et al. | |
| 2009/0322689 A1 | 12/2009 | Kwong et al. | |
| 2010/0277439 A1 | 11/2010 | Charlier et al. | |
| 2011/0012928 A1 | 1/2011 | Cholewin et al. | |
| 2011/0242750 A1 | 10/2011 | Oakley | |
| 2011/0255727 A1 | 10/2011 | Azuchi | |
| 2012/0162270 A1* | 6/2012 | Fleck et al. | 345/690 |
| 2012/0212424 A1* | 8/2012 | Sharma | 345/173 |
| 2012/0235949 A1* | 9/2012 | Ligtenberg | 345/174 |
| 2013/0321288 A1 | 12/2013 | Adamson et al. | |

OTHER PUBLICATIONS

Restriction Requirement received for U.S. Appl. No. 29/423,470, mailed on Apr. 5, 2013.
Notice of Allowance received for U.S. Appl. No. 29/423,470, mailed on May 30, 2013.
Design U.S. Appl. No. 29/468,750 entitled At Least Partially Transparent Input Device for an Electronic Computer, filed Oct. 2, 2013, inventors Peter Adamson, et al.
Restriction Requirement received for U.S. Appl. No. 29/423,471, mailed on Apr. 16, 2013.
Office Action Received for U.S. Appl. No. 29/423,471, mailed on May 30, 2013.
Notice of allowance received for U.S. Appl. No. 29/423,471 mailed on Sep. 18, 2013.
Supplemental Notice of allowance received for U.S. Appl. No. 29/423,471 mailed on Oct. 15, 2013.
Supplemental Notice of Allowance received for U.S. Appl. No. 29/423,471 mailed on Dec. 17, 2013.
Design U.S. Appl. No. 29/478,168, entitled At Least Partially Transparent Input Device for an Electronic Computer, filed Dec. 31, 2013, inventors Peter S. Adamson et al.
Restriction Requirement received for U.S. Appl. No. 29/423,472, mailed on Apr. 17, 2013.
Non-Final Office Action Received for U.S. Appl. No. 29/423,472, mailed on May 30, 2013.
Notice of Allowance received for U.S. Appl. No. 29/423,472, mailed on Sep. 19, 2013.
Supplemental Notice of allowance received for U.S. Appl. No. 29/423,472, mailed on Dec. 17, 2013.
Design U.S. Appl. No. 29/478,161, entitled At Least Partially Transparent Input Device for an Electronic Computer, filed Dec. 31, 2013, inventors Peter S. Adamson et al.
Restriction Requirement received for U.S. Appl. No. 29/423,474, mailed on May 1, 2013.
Non-Final Office Action Received for U.S. Appl. No. 29/423,474, mailed on Jun. 6, 2013.
Notice of Allowance received for U.S. Appl. No. 29/423,474, mailed on Oct. 25, 2013.
Supplemental Notice of allowance received for U.S. Appl. No. 29/423,474, mailed on Dec. 18, 2013.
Design U.S. Appl. No. 29/481,121, entitled At Least Partially Transparent Input Device for an Electronic Computer, filed Jan. 31, 2014, inventors Peter S. Adamson et al.
Restriction Requirement in U.S. Appl. No. 29/423,475 mailed on May 2, 2013.
Notice of Allowance received for U.S. Appl. No. 29/423,475, mailed on Jul. 2, 2013.
Design U.S. Appl. No. 29/473,585, entitled At Least Partially Transparent Input Device for an Electronic Computer, filed Nov. 24, 2013, inventors Peter S. Adamson et al.
Design U.S. Appl. No. 29/423,476, entitled Electronic Computer With an At Least Partially Transparent Input Device, filed Jun. 1, 2012, inventors Peter S. Adamson et al.
Ex Parte Quayle Action received for U.S. Appl. No. 29/423,476 mailed on Apr. 8, 2013.
Notice of Allowance received for U.S. Appl. No. 29/423,476 mailed on Jun. 28, 2013.
Supplemental Notice of Allowance received for U.S. Appl. No. 29/423,476 mailed on Aug. 6, 2013.
Notice of Allowance received for U.S. Appl No. 29/423,476, mailed on Oct. 25, 2013.
Supplemental Notice of allowance received for U.S. Appl. No. 29/423,476 mailed on Dec. 17, 2013.
Non-Final Office Action Received for U.S. Appl. No. 29/423,474, mailed on Jun. 26, 2013.
Final Office Action in U.S. Appl. No. 13/485,690 mailed on Jan. 13, 2015.
Notice of Allowance in U.S. Appl. No. 29/468,750 mailed on Jan. 14, 2015.
Non-Final Office Action in U.S. Appl. No. 29/473,585 mailed on Jan. 9, 2015.
Non-Final Office Action in U.S. Appl. No. 13/485,690 mailed on Aug. 1, 2014.

* cited by examiner

DUAL TOUCH SURFACE MULTIPLE FUNCTION INPUT DEVICE

TECHNICAL FIELD

Embodiments described herein generally relate to touch sensitive input.

BRIEF DESCRIPTION OF THE DRAWINGS

Embodiments are illustrated by way of example and not limitation in the figures of the accompanying drawings, in which like references indicate similar elements and in which.

The figures of the drawings are not necessarily drawn to scale.

DETAILED DESCRIPTION

The following detailed description sets forth example embodiments of apparatuses, methods, and systems relating to dual touch surface multiple function input devices. Features, such as structure(s), function(s), and/or characteristic(s) for example, are described with reference to one embodiment as a matter of convenience; various embodiments may be implemented with any suitable one or more described features.

With traditional laptops or notebook computers, a user must open the notebook computer in order to view displayed information or interact with the notebook. As a result, most users today only use their notebook computers when they are stationary such as while they are at their desk or when they are sitting at a coffee shop. One ergonomic drawback of current notebook computer designs is that they are not conducive to being used while the user is in motion, such as when walking, or when the user is standing because the display of the notebook computer is typically viewable only when the lid of the notebook computer is open.

Particular embodiments described herein provide for an electronic device, such as a notebook computer, having a touch sensor sandwiched between a top and bottom sheet of transparent material, such as one or more of glass and/or plastic, that provides a clear window configured to allow a user to view through a base portion of the electronic device. In one embodiment, respective surfaces of the two sheets of transparent material function as touch surfaces of a touch input device. In one particular embodiment, the clear window is provided below a keyboard disposed on or supported by the base portion of the electronic device. In another particular embodiment, the clear window is in a palm rest portion of the electronic device. In still another embodiment, the clear window is below a space bar of a keyboard of the electronic device. When the notebook computer is open, a touch surface of the top sheet is used as a traditional touchpad mouse device to allow movement of a cursor on a display of the electronic device in one particular embodiment. In one particular embodiment, when the electronic device is closed, the touch surface of the bottom sheet serves as a touchscreen for a portion of the display of the electronic device that is visible through the clear window. In one or more embodiments, this allows a user to see a portion of the display and use the electronic device when the lid of the electronic device is closed for a variety of different content consumption opportunities via a software application that reformats content for the smaller display area when the lid is closed. In one particular embodiment, the software application reformats content provided by software applications such as, but not limited to, e-mail, a calendar application, and/or social media applications. These social media applications may include applications such as Facebook, Twitter, or RSS feed applications. In still another embodiment, the software application may allow viewing and/or lightweight editing of photos displayed on the visible portion of the display screen using the touchscreen functionality of the touch input device when the lid of the notebook is closed.

Electronic Device with Dual Touch Surface Multiple Function Input Device

Figure 1:
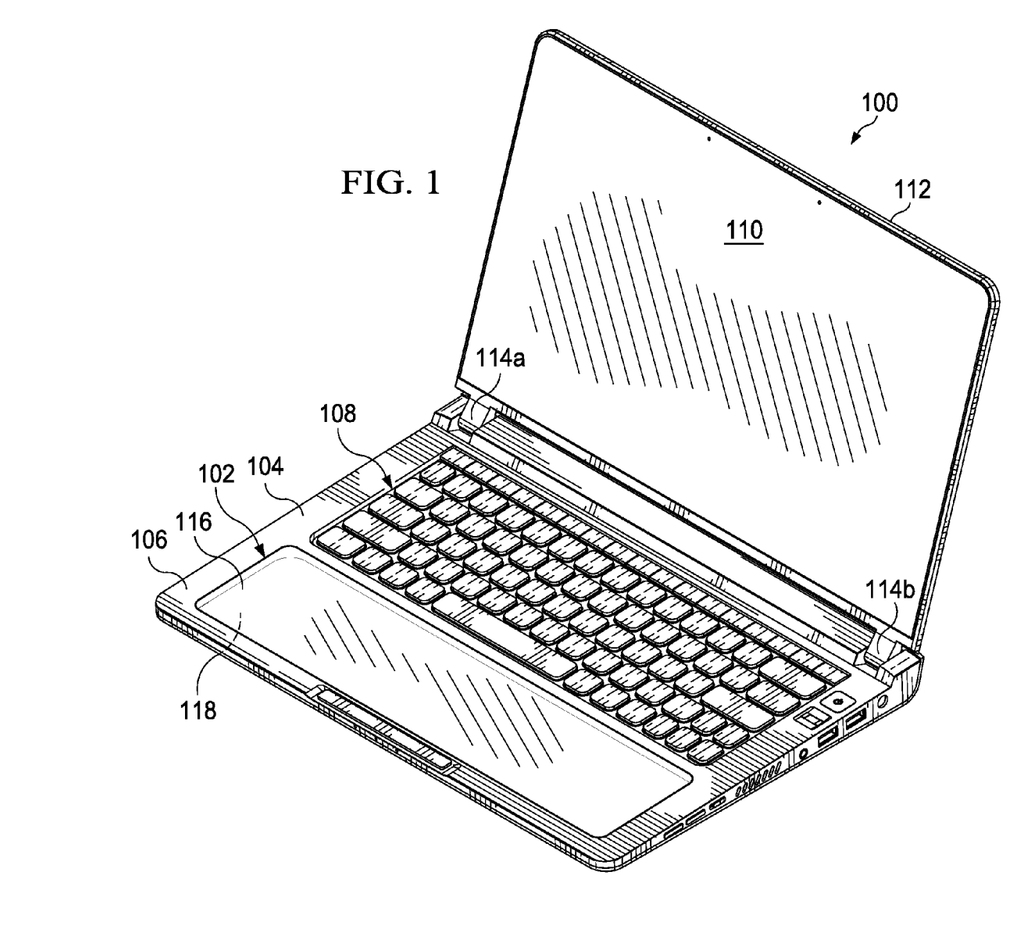
FIG. 1 illustrates an embodiment of an electronic device in an open configuration having a touch input device providing dual touch surfaces with a single touch sensor.

FIG. 1 illustrates an embodiment of an electronic device 100 in an open configuration having a touch input device 102 providing dual touch surfaces with a single touch sensor. Touch input device 102 is disposed on/in a lower housing 104 of electronic device 100. In the particular embodiment illustrated in FIG. 1, touch input device 102 is disposed within/on and/or supported by a base portion 106 of lower housing 104 below a keyboard 108. In the particular embodiment illustrated in FIG. 1, base portion 106 of lower housing 104 includes a palm rest area of electronic device 100. In the embodiment illustrated in FIG. 1, touch input device 102 extends across a substantial portion of a length of base portion 106 of lower housing 104. Electronic device 100 further includes a display device 110 disposed within/on and/or supported by an upper housing 112. In one or more embodiment, display device 110 includes a display screen that may be a liquid crystal display (LCD) display screen, a light-emitting diode (LED) display screen, an organic light-emitting diode (OLED) display screen, a plasma display screen, or any other suitable display screen.

In one embodiment, upper housing 112 is a lid portion of electronic device 100. In at least one embodiment, lower housing 104 and upper housing 112 are hingedly coupled via a first hinge 114a and a second hinge 114b in a clamshell configuration such that lower housing 104 and an upper housing 112 may be at least partially rotated to allow touch input device 102 and display device 110 to be folded toward one another in a closed configuration and to be unfolded away from one another in an open configuration. In one or more embodiments, electronic device 100 is a notebook computer or laptop computer. In still other embodiments, electronic device 100 may be any suitable electronic device having a touchpad and a display such as a mobile device, a tablet computers and/or tablet devices, a personal digital assistant (PDA), etc. In one embodiment, FIG. 1 shows electronic device 100 in an open configuration and touch input device 102 is disposed below keyboard 108 in a location in which a user of electronic device 100 would normally rest his or her palms.

Touch input device 102 includes a first touch surface layer 116 over which touches may be detected and a second touch surface layer 118 over which touches may be detected. First touch surface layer 116 is disposed within/on and/or supported by an upper side of lower housing 104, and second touch surface 118 is disposed within/on and/or supported by a lower side of lower housing 104. In various embodiments, a single touch sensor 120 (e.g., see FIG. 4) is disposed between first touch surface layer 116 and second touch surface layer 118, and first touch surface layer 116 and second touch surface layer 118 are disposed within and/or supported by lower housing 104. In at least one embodiment, first touch surface layer 116, second touch surface layer 118, and touch sensor 120 of touch input device 102 each has an at least partially transparent material. In one embodiment, touch sensor 120 is configured to detect a first touch input associated with first touch surface layer 116 and/or a second touch input associated with second touch surface layer 118. In a particular embodiment, first touch surface layer 116 and second touch surface layer 118 includes one or more of a glass sheet or plastic sheet. In still other embodiments, any suitable transparent or semi-transparent material may be used to form first touch surface layer 116 and second touch surface layer 118. In at least one embodiment, touch input device 102 is a capacitive touch device configured to detect a touch on both first touch surface layer 116 and second touch surface layer 118 using a single touch sensor 118.

Although touch sensor 120 described in various embodiments as being touch-sensitive to a user's finger, in still other embodiments touch sensor 120 may be touch-sensitive to any suitable one or more objects, including a user's finger, a stylus, and/or a pen, for example.

In accordance with various embodiments, touches (or contacts) by a user on first touch surface layer 116 and second touch surface layer 118 are interpreted differently by electronic device 100 depending on whether electronic device 100 is in an open configuration or a closed configuration. This can be inclusive of the possible detection by the system of these configurations. In at least one embodiment, when electronic device 100 is in an open configuration touches on a first touch surface layer 116 are interpreted by electronic device 100 as touches on a touchpad. In at least one embodiment, when electronic device 100 is in a closed configuration touches on second touch surface layer 118 are interpreted by electronic device 100 as touchscreen touches on display device 110. In one or more embodiments, touches on first touch surface layer 116 and second touch surface layer 118 are interpreted as touchpad touches and/or touchscreen touches by touch control logic 624 (see FIG. 6).

As previously discussed, FIG. 1 illustrates electronic device 100 in an open configuration. In the open configuration, touch input device 102 is configured to function as a touchpad in which a user may touch a portion of first touch surface layer 116 to provide touch inputs to electronic device 100. These touch inputs are mapped to allow the user to interact with the entire portion of a screen of display device 110 when electronic device 100 is determined to be in the open position as will be further described herein. For example, a user may touch a portion of first touch surface layer 116 to allow the user to manipulate a cursor displayed by display device 110.

Figure 2:
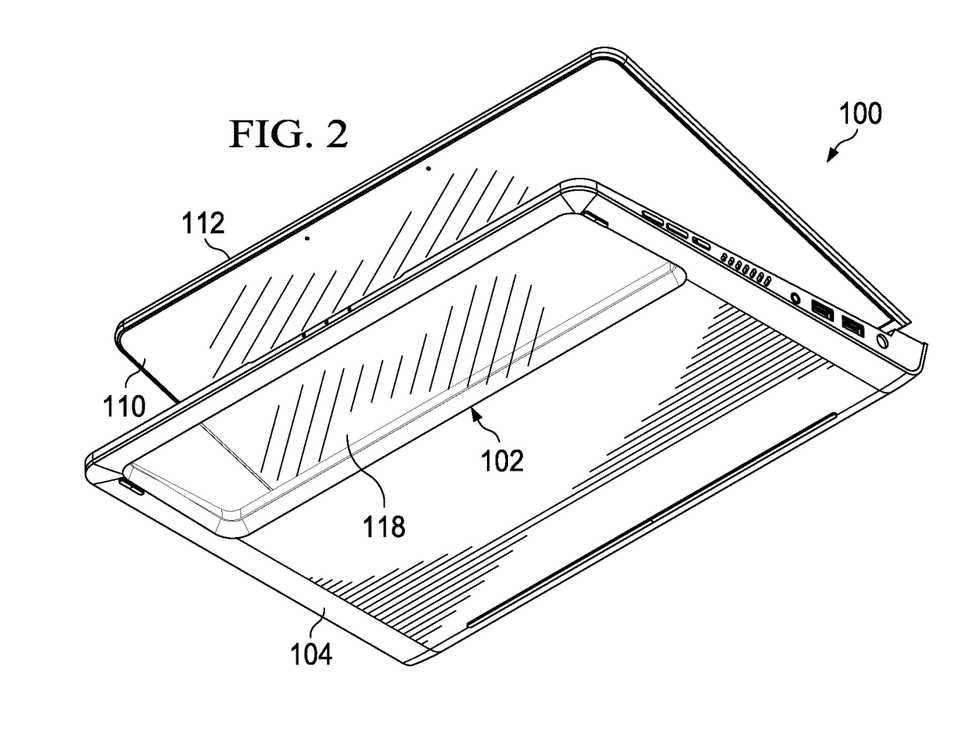
FIG. 2 illustrates an embodiment of the electronic device in a partially closed configuration.

FIG. 2 illustrates an embodiment of electronic device 100 in a partially closed configuration. As illustrated in FIG. 2, as electronic device 100 is in the process of being transitioned from an open configuration to a closed configuration, display device 110 and touch input device 102 are brought in closer proximity to one another.

Figure 3:
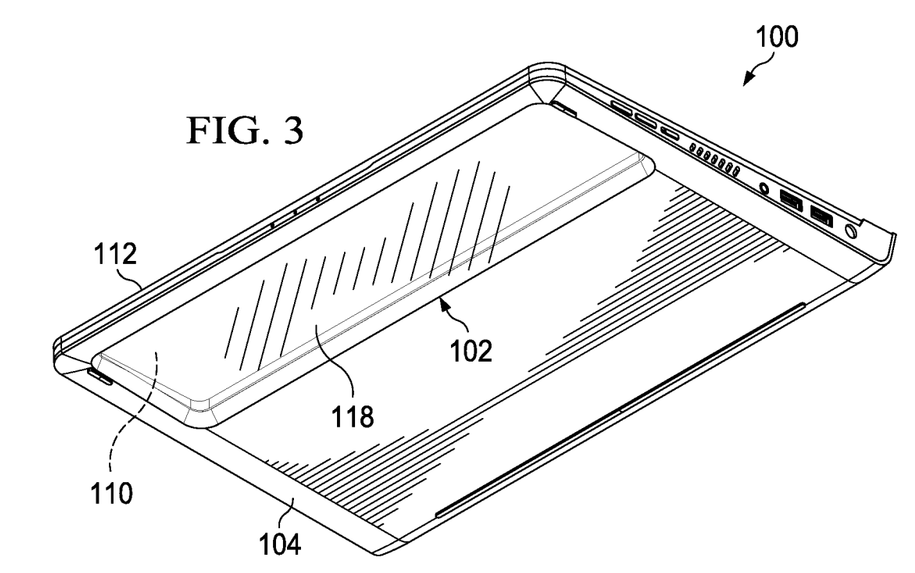
FIG. 3 illustrates an embodiment of the electronic device in a closed configuration.

FIG. 3 illustrates an embodiment of electronic device 100 in a closed configuration. In one embodiment, folding electronic device 100 into the closed configuration may help make electronic device 100 more compact for easier mobility and/or storage relative to the open configuration. In the closed configuration, touch input device 102 and display device 110 are positioned in close proximity to and/or substantially parallel with one another. In the closed configuration, in one embodiment, due to the transparent nature of touch input device 102, at least a portion of touch input device 102 functions as or includes an at least partially transparent window to allow a portion of the screen of display device 110 to remain visible to a user. In particular embodiments, one or more software applications are configured such that they are displayed within the portion of display device 110 still visible when electronic device 100 is in the closed configuration. In one embodiment, when electronic device 100 is in the closed configuration, a touch on second touch surface layer 118 of touch input device 102 operates as a touchscreen allowing a user to interact with the portion of display device 110 still visible through touch input device 102. In one or more embodiments, substantially the entire portion of second touch surface layer 118 may be used as a touchscreen for the portion of display device 110 underlying touch input device 102 when electronic device 100 is in the closed configuration. In the closed configuration, in one embodiment, touch inputs to second touch surface layer 118 are mapped, for example by touch control logic 624 of FIG. 6, such that they are interpreted by electronic device 100 as touchscreen interactions with display device 110 as will be further described herein.

In one embodiment, electronic device 100 is provided with a software application that can reformat content on display device 110 to correspond to the smaller visible display area when the lid is closed. In one particular operation, the software application reformats content provided by software applications such as (but not limited to), e-mail, a calendar application, games, and/or social media applications. These social media applications may include applications such as Facebook, Twitter, or RSS feed applications. In still another embodiment, the software application may allow viewing and/or lightweight editing of photos displayed on the visible portion of the display screen using the touchscreen functionality of the touch input device when the lid of the notebook is closed. In one or more embodiments, the software application is user-configurable to allow a user to choose which applications (e.g., Word processing applications, social media applications, etc.) will be reformatted for display in the closed configuration and/or in what manner or format the reformatting will be performed.

In still other embodiments, electronic device 100 may include a hybrid mode in which touches to first touch surface layer 116 of touch input device 102 when electronic device 100 is in the open configuration may be treated as indirect touchpad interactions by the user in which touches to touch input device 102 are mapped as indirect cursor movements to display device 110 and/or indirect touchscreen interactions by the user in which touches to touch input device 102 are mapped to display device 110 as gestures. FIG. 1 shows electronic device 100 in the open configuration. In this orientation, electronic device 102 is operating in the hybrid mode where touches are either for a touchpad in which touches are mapped to indirect cursor movements on the screen of display device 110 or indirect touchscreen in which touches are mapped to the screen of display device 110 as gestures. To use electronic device 102 in direct touchscreen mode, the user closes upper housing 112 (or lid) as illustrated in FIG. 2 and rotates electronic device 102 so that a bottom of the lower housing 104 is facing the user with a portion of display device 110 visible through touch input device 102 as illustrated in FIG. 3. In this orientation, touch input device 102 of electronic device 100 is operating in a direct touch touchscreen mode. In the direct touch touchscreen mode in which electronic device 100 is in a closed configuration, touches to second touch surface layer 118 of touch input device 102 are mapped directly to the screen of display device 110. Accordingly, in a particular embodiment, electronic device 100 is in the hybrid mode when electronic device 100 is open and in a direct touch touchscreen mode when electronic device 100 is in a closed configuration.

Figure 4:
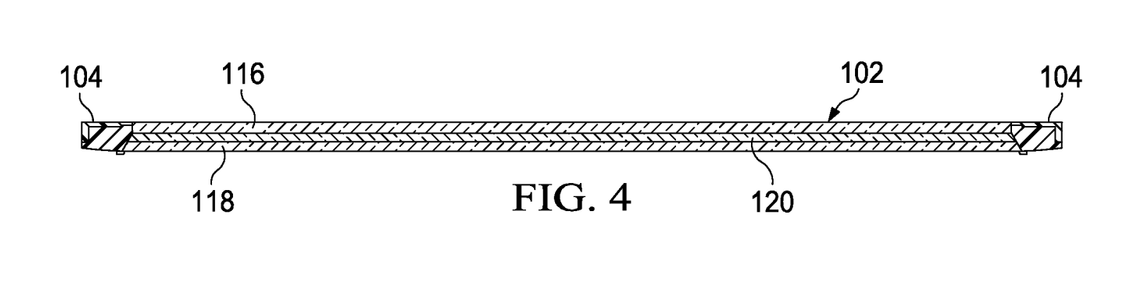
FIG. 4 illustrates a cross-sectional view of an embodiment of the touch input device of the electronic device.

FIG. 4 illustrates a cross-sectional view of an embodiment of touch input device 102 of electronic device 100. In the embodiment illustrated in FIG. 4, touch input device 102 is comprised of touch sensor 120 being sandwiched between first touch surface layer 116 and second touch surface layer 118 and disposed within and/or supported by lower housing 104. In one or more embodiments, touch sensor 120 is a single touch sensor configured to detect touches on both first touch surface layer 116 and second touch surface layer 118. In one or more embodiments, first touch surface layer 116, second touch surface layer 118, and touch sensor 120 have an at least partially transparent material. In particular embodiments, both first touch surface layer 116 and second touch surface layer 118 have transparent material that includes one or more of glass and/or plastic sheets. In still other embodiments, other suitable transparent or semi-transparent materials may be used to construct first touch surface layer 116, second touch surface layer 118, and touch sensor 120. In some embodiments, first touch surface layer 116 and second touch surface layer 118 include a tinted material. In various embodiments, touch input device 102 may be constructed using capacitive touch-sensitive technology, resistive touch-sensitive technology, or any other suitable touch-sensitive technology.

Figure 5A:
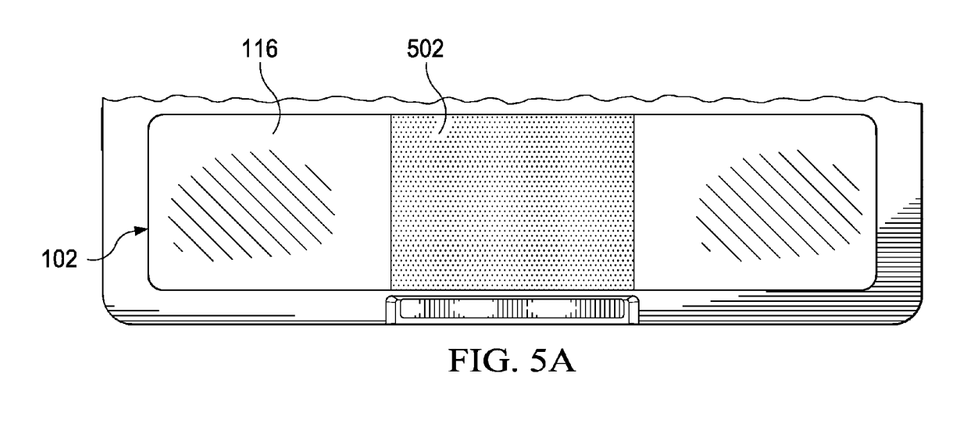
FIGS. 5A-5B illustrate a top view of an embodiment of the touch input device of the electronic device in which a first touch surface includes a touchpad area.
Figure 5B:
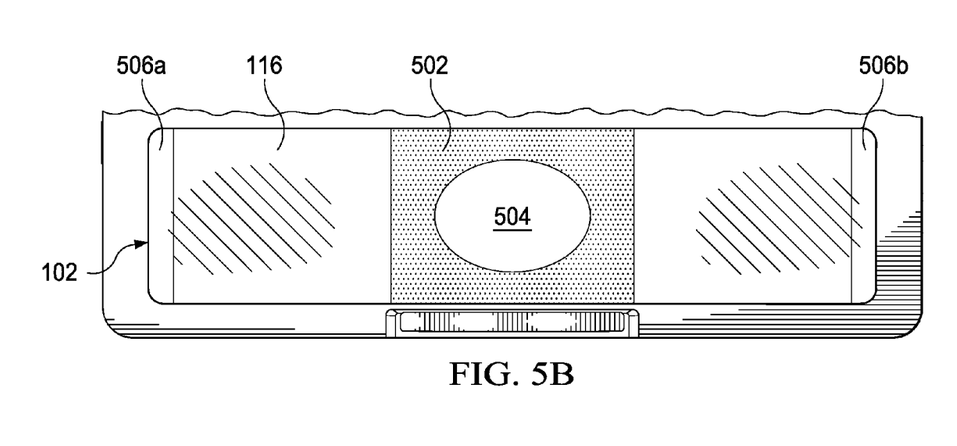

FIGS. 5A-5B illustrate a top view of an embodiment of touch input device 102 of electronic device 100 in which first touch surface layer 116 includes a touchpad area 502. In various embodiments, touchpad area 502 covers a portion of the area of first touch surface layer 116 of touch input device 102. In one or more embodiments, touchpad area 502 is a region of first touch surface layer 116 that a user interacts with when electronic device 100 is in a touchpad mode, such as when electronic device 100 is in an open configuration. In a particular embodiment, touchpad area 502 is a region within the center third of first touch surface layer 116. In one or more embodiments, to aid in cursor movement mapping, touchpad area 502 has the same or similar aspect ratio as display device 110. In various embodiments, when electronic device 100 is in touchpad mode touches will be ignored until the touchpad has been activated. In one embodiment, a user activates the touchpad by touching touchpad area 502 within a touchpad activation area 504 as shown in FIG. 5B. Once the touchpad mode has been activated, the user can then move a cursor in display device 110 by dragging the user's finger within touchpad area 502. In one or more embodiments, to exit touchpad mode the user removes a finger from (i.e. stops touching) touchpad area 502, or alternately drags his or her finger outside of touchpad area 502. In the particular embodiment illustrated in FIG. 5B, touchpad activation area 504 is smaller than touchpad area 502. In a particular embodiment, touchpad activation area 504 has an oval shape. In one or more embodiments, touchpad activation area 504 is provided to avoid accidentally activating the cursor while the user is using keyboard 108 to type or when the user is resting his or her palms upon first touch surface layer 116.

In the particular embodiment illustrated in FIG. 5B, first touch surface layer 116 further includes one or more gesture areas 506a and 506b along both outside edges of first touch surface layer 116. In one or more embodiments, touches in gesture areas 506a and 506b are interpreted as gestures used, for example, for scrolling, flicking, or bringing up operating system menus within display device 110. In one embodiment, touchpad area 502 and/or gesture areas 506a and 506b are marked on first touch surface layer 116 by a visual indication showing the boundaries of these areas upon the surface of first touch surface layer 116. In still another embodiment, touchpad area 502 and/or gesture areas 506a and 506b are marked on first touch surface layer 116 by a change in surface texture on first touch surface layer 116 such as a transition from a rough to smooth texture. In one embodiment, electronic device 100 may be further enhanced with palm rejection technology so that only purposeful touches with a finger are interpreted as a "touch" while touches that are determined to not be purposeful on first touch surface layer 116 of touch input device 102, such as a user resting his or her palm on first touch surface layer 116, are ignored.

As previously discussed, in one or more embodiments, substantially the entire portion of second touch surface layer 118 may be used as a touchscreen for the portion of display device 110 underlying touch input device 102 when electronic device 100 is in the closed configuration. Thus, in at least one embodiment, touch input device 102 is configured to have a first active touch surface comprised of touchpad area 502 when lower housing 104 and upper housing 112 are in the open configuration, and a second active touch surface comprised of substantially all of second touch layer 118 when lower housing 104 and upper housing 112 are in the closed configuration. In one embodiment, the first active touch surface is smaller than the second active touch surface.

Although in the embodiments illustrated in FIGS. 1-3 touch input device 102 is illustrated as being generally rectangular in shape, in still other embodiments of electronic device 100 touch input device 102 may include first touch surface layer 116 and second touch surface layer 118 being configured to be of any suitable size and shape. For example, touch input device 102 for some embodiments may have first touch surface layer 116 and second touch surface layer 118, respectively, shaped to either be rectangular, oval, square, generally rectangular with rounded corners, or any other suitable shapes. In the embodiment illustrated in FIGS. 1-3, touch input device 102, or an at least partially transparent window of touch input device 102, is sized to extend across a substantial portion of a length of base portion 106 of lower housing 104. In still other embodiments, touch input device 102 may be sized to extend three-quarters (¾) or more of the length of base portion 106 and/or keyboard 108. In still other embodiments, touch input device 102 may be sized extend one-half (½) or more of the length of base portion 106 and/or keyboard 108. In still more embodiments, touch input device 102 may be sized extend one-quarter (¼) or more of the length of base portion 106 and/or keyboard 108. In another embodiment, touch input device 102 may be sized to extend one-third (⅓) or more of the length of base portion 106 and/or keyboard 108. In another embodiment, touch input device 102 may be sized to extend two-thirds (⅔) or more of the length of base portion 106 and/or keyboard 108. In one embodiment, inside corners of touch input device 102 may be rectangular in shape. In still other embodiments, inside corners of touch input device 102 may be rounded in shape.

Although described for one embodiment as comprising lower housing 104 and upper housing 112 that supports touch input device 104 and display device 110, respectively, in a clamshell configuration, electronic device 100 may comprise any suitable housing structure to support touch input device 104 and display device 110 in any suitable manner. Suitable housing structure for one embodiment may support touch input device 104 and display device 110 near one another in any suitable configuration to allowing viewing of a portion of display device 110 through touch input device 102 when electronic device 100 is in a touchscreen configuration.

Example System for Electronic Device

Figure 6:
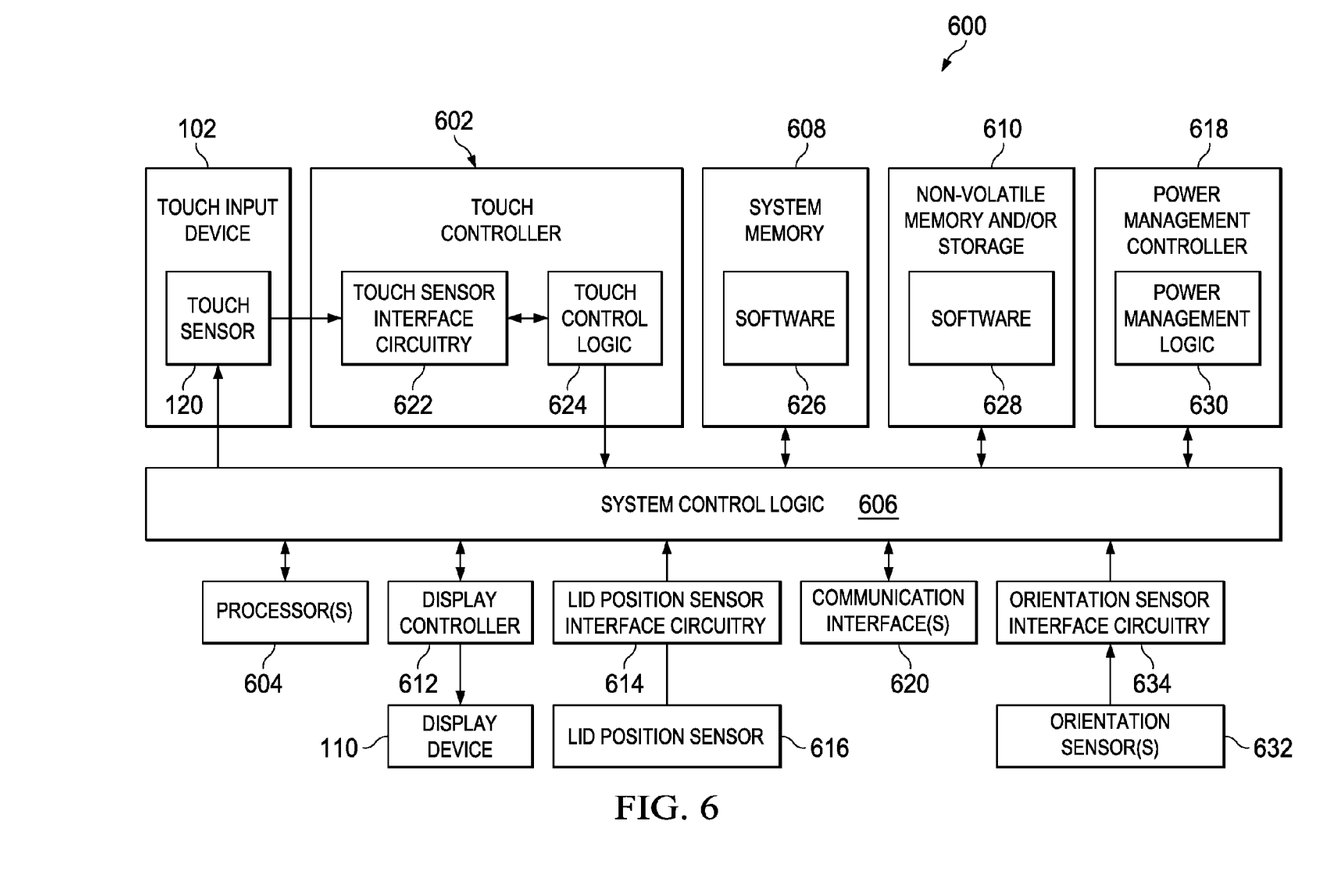
FIG. 6 illustrates an embodiment of an example system of the electronic device.

Electronic device 100 may be implemented using any suitable hardware and/or software to configure electronic device 100 as desired. FIG. 6 illustrates an embodiment of an example system 600 of electronic device 100. System 600 includes touch input device 102, a touch controller 602, one or more processors 604, system control logic 606 coupled to at least one of processor(s) 604, system memory 608 coupled to system control logic 606, non-volatile memory and/or storage device(s) 610 coupled to system control logic 606, display controller 612 coupled to system control logic 606, display controller 612 coupled to display device 110, lid position sensor interface circuitry 614 coupled to system control logic 606, lid position sensor 616 coupled to lid position sensor interface circuitry 614, power management controller 618 coupled to system control logic 606, and communication interfaces 620 coupled to system control logic 606.

Touch input device 102 includes touch sensor 120 and may each be implemented using any suitable touch-sensitive technology such as, for example and without limitation, capacitive, resistive, surface acoustic wave (SAW), infrared, and optical imaging. The touch-sensitive technology used for touch input device 102 for one embodiment may not require actual touching over first touch surface layer 116 and/or second touch surface layer 118, respectively, but rather may sense the presence of an object near first touch surface layer 116 and/or second touch surface layer 118, respectively. Such technology may nevertheless be considered touch-sensitive because such technology will similarly sense an object that actually touches over first touch surface layer 116 and/or second touch surface layer 118 and because first touch surface layer 116 and/or second touch surface layer 118 are likely to be actually touched when electronic device 100 is used. Touch input device 102 for one embodiment may be implemented using any suitable multi-touch technology.

Display device 110 includes a display screen that may be implemented using any suitable display technology, such as that for an LCD display screen, an LED display screen, an OLED display screen, a plasma display screen, or any other suitable display screen.

System control logic 606 for one embodiment may include any suitable interface controllers to provide for any suitable interface to at least one processor 604 and/or to any suitable device or component in communication with system control logic 606. System control logic 606 for one embodiment may include one or more memory controllers to provide an interface to system memory 608. System memory 608 may be used to load and store data and/or instructions, for example, for system 600. System memory 608 for one embodiment may include any suitable volatile memory, such as suitable dynamic random access memory (DRAM) for example. System control logic 606 for one embodiment may include one or more input/output (I/O) controllers to provide an interface to display device 110, touch controller 602, and non-volatile memory and/or storage device(s) 610.

Non-volatile memory and/or storage device(s) 610 may be used to store data and/or instructions, for example. Non-volatile memory and/or storage device(s) 610 may include any suitable non-volatile memory, such as flash memory for example, and/or may include any suitable non-volatile storage device(s), such as one or more hard disk drives (HDDs), solid-state drives (SSDs), one or more compact disc (CD) drives, one or more digital versatile disc (DVD) drives, and/or Blu-ray disc (BD) drives for example.

Touch controller 602 may be coupled to help control touch input through touch input device 110. Touch controller 602 for one embodiment may be coupled to system control logic 606 and/or at least one processor 604 to process touch input detected by touch controller 602 through first touch surface layer 116 and/or second touch surface layer 118 of touch sensor 120.

Lid position sensor interface circuitry 614 is configured to receive a lid position signal from lid position sensor 616 and provide the lid position signal to system control logic 606. In various embodiments, lid position sensor 616 senses the relative position of lower housing 104 with respect to upper housing 112. In various embodiments, lid position sensor 616 and lid position sensor interface circuitry 614 are used to determine whether electronic device 100 is in an open configuration or in a closed configuration. In one or more embodiments, the lid position signal is provided to touch controller 602 by system control logic 606 to be used to determine whether first touch surface layer 116 or second touch surface layer 118 is currently active for receiving touch input from a user. For example, in one embodiment, when touch controller 602 receives an indication that electronic device 100 is in an open configuration, touch controller 602 is configured to receive one or more signals associated with touch inputs from first touch surface layer 116 of touch sensor 120. When touch controller 602 receives an indication that electronic device 100 is in a closed configuration, touch controller 602 is configured to receive one or more signals associated with touch inputs from second touch surface layer 118 of touch sensor 120. In a particular embodiment, lid position sensor 616 is one or more angle sensors disposed at or proximate to first hinge 114a and/or second hinge 114b.

Power management controller 618 includes power management logic 630 configured to control various power management and/or power saving functions of electronic device 100 based upon whether electronic device 100 is in an open configuration or a closed configuration and/or a physical orientation of electronic device 100. In one embodiment power management controller 618 is configured to reduce the power consumption of components or devices of system 600 that may either be operated at reduced power or turned off when electronic device 100 is in the closed configuration. For example, in a particular embodiment when electronic device 100 is in a closed configuration, power management controller 618 may perform one or more of the following: power down or reduce the power consumption of the unused portion of display device 110, display controller 612, and/or a portion of any backlight associated therewith; allow one or more of processor(s) 604 to go to a lower power state if less computing power is required in the closed configuration; and/or shutdown or reduce power to any devices and/or components, such as keyboard 108, that are unused or not needed when electronic device 100 is in the closed configuration. In still other embodiments, power management logic 630 and/or software 626 may be configured to perform one or more of the following even when electronic device 100 is in the open configuration: shut down or reduce power to a portion of display device 110, display controller 612, and/or a portion of a backlight associated therewith; allow one or more of processor(s) 604 to go to a lower power state if less computing power is required; and/or shutdown any devices and/or components that are unused or not needed.

In one or more embodiments, electronic device 100 may further include one or more orientation sensor(s) 632 coupled to orientation sensor interface circuitry 634. Orientation sensor interface circuitry 634 is further coupled to system control logic 606. In a particular embodiment, orientation sensor(s) 632 may include a gyro sensor. In still other embodiments, any other suitable orientation sensor may be used. Orientation sensor(s) 632 provide one or more signals representative of the current physical orientation of electronic device 100 to orientation sensor interface circuitry 634. Orientation sensor interface circuitry 634 then provides the orientation signals to system control logic 606, and system control logic 606 provides the orientation signals to power management controller 618. The orientation signals are used by power management logic 630 of power management controller 618 to control power consumption of various components and devices of electronic device 100 based on the physical orientation of electronic device 100.

In one embodiment, power management controller 618 deactivates touch input device 102 and/or display device 110 based on the physical orientation of touch input device 102. For instance, when electronic device 100 is in a closed configuration and second touch surface layer 118 of touch input device 102 and the display screen of display device 110 are facing downward as determined by orientation sensor(s) 632, power management controller 618 may turn off and/or reduce power to display device 110 and/or touch input device 102 because the user cannot interact with touch input device 102 or view display device 100 when electronic device 100 is in this configuration and orientation. In one or more embodiments, electronic device 100 uses physical sensors, such as orientation sensor(s) 632 to detect the orientation of electronic device 100, and display device 110 and/or touch input device 102 are turned off automatically when electronic device 100 is in the closed configuration and positioned in an orientation such that display device 110 and/or touch input device 102 are unusable, e.g. facing down. In a particular embodiment, orientation sensor(s) 632 include a gyro. In still other embodiments, power management controller 618 may turn off and/or reduce power to one or more of display device 110 and/or touch input device 102 when one or more of touch input device 102 and/or display device 110 are identified as oriented in a predetermined direction.

Communications interface(s) 620 may provide an interface for system 600 to communicate over one or more networks and/or with any other suitable device. Communications interface(s) 620 may include any suitable hardware and/or firmware. Communications interface(s) 620 for one embodiment may include, for example, a network adapter, a wireless network adapter, a telephone modem, and/or a wireless modem.

System control logic 606 for one embodiment may include one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner.

For one embodiment, at least one processor 604 may be packaged together with logic for one or more controllers of system control logic 606. For one embodiment, at least one processor 604 may be packaged together with logic for one or more controllers of system control logic 606 to form a System in Package (SiP). For one embodiment, at least one processor 604 may be integrated on the same die with logic for one or more controllers of system control logic 606. For one embodiment, at least one processor 604 may be integrated on the same die with logic for one or more controllers of system control logic 606 to form a System on Chip (SoC).

Although described for one embodiment as being used in system 600, touch input device 110 may be used in other system configurations.

Touch Controller

Touch controller 602 for one embodiment, as illustrated in FIG. 6, may include touch sensor interface circuitry 622 and touch control logic 624. Touch sensor interface circuitry 622 may be coupled to detect touch input over first touch surface layer 116 and second touch surface layer 118 by touch sensor 120 of touch input device 102, in any suitable manner. Touch sensor interface circuitry 622 may include any suitable circuitry that may depend, for example, at least in part on the touch-sensitive technology used for touch input device 102. Touch sensor interface circuitry 622 for one embodiment may support any suitable multi-touch technology. Touch sensor interface circuitry 622 for one embodiment may include any suitable circuitry to convert analog signals corresponding to first touch surface layer 116 and second surface layer 118 into any suitable digital touch input data. Suitable digital touch input data for one embodiment may include, for example, touch location or coordinate data.

Touch control logic 624 may be coupled to help control touch sensor interface circuitry 622 in any suitable manner to detect touch input over first touch surface layer 116 and second touch surface layer 118. Touch control logic 624 for one embodiment may also be coupled to output in any suitable manner digital touch input data corresponding to touch input detected by touch sensor interface circuitry 622. Touch control logic 624 may be implemented using any suitable logic, including any suitable hardware, firmware, and/or software logic, that may depend, for example, at least in part on the circuitry used for touch sensor interface circuitry 622. Touch control logic 624 for one embodiment may support any suitable multi-touch technology.

Touch control logic 624 for one embodiment, as illustrated in FIG. 6, may be coupled to output digital touch input data to system control logic 606 and/or at least one processor 604 for processing. At least one processor 604 for one embodiment may execute any suitable software to process digital touch input data output from touch control logic 624. Suitable software may include, for example, any suitable driver software and/or any suitable application software. As illustrated in FIG. 6, system memory 608 may store suitable software 626 and/or non-volatile memory and/or storage device(s) 450 may store suitable software 628 for execution by at least one processor 604 to process digital touch input data.

Touch sensor interface circuitry 622 and/or touch control logic 624 for one embodiment may generate digital touch input data corresponding to touch inputs on at least a portion of each of first touch surface layer 116 and second touch surface layer 118. Touch control logic 624 in one embodiment is configured to map touch inputs to display device 110 differently depending on whether electronic device 100 is in an open configuration, closed configuration and/or whether electronic device 100 is in a touchpad mode or touchscreen mode. In one embodiment, touch control logic 624 is configured to map touch input associated with first touch surface layer 116 to display device 110 as a touchpad interaction if lower housing 104 and upper housing 112 are in the open configuration. In one embodiment, touch control logic 624 is configured to map touch input associated with second touch surface layer 118 to display device 110 as a touchscreen interaction if lower housing 104 and upper housing 112 are in the closed configuration. This allows touch input device 102 having a single touch sensor 122 to function as both a touchscreen to provide direct touch mapping to a portion of display device 110 under touch input device 102 via second touch surface layer 118 when electronic device 100 is in a closed configuration, and a touchpad allowing a user to indirectly manipulate a mouse-like cursor using touch via first touch surface layer 116 when electronic device 100 is in an open configuration. In one or more embodiments, touch control logic 624 and/or a software driver within software 626 of system memory 608 interpret touches on touch input device 102 based on the open or closed configuration of electronic device 100 to determine which side of touch input device 102 the user touched (i.e., whether the user touches first touch surface layer 116 or second touch surface layer 118). In various embodiments, this allows touch input device 102 to serve as two different kinds of touch input devices while having a single touch sensor 120.

In one embodiment, depending on the orientation of touch input device 102 and which side of touch input device 102 was touched, touch control logic 624 may map touches on either first touch surface layer 116 and second touch surface layer 118 to display device 110 in a different manner. For example, in a particular embodiment touch control logic 624 may multiply touchpad coordinates in order to map relative cursor movement on the touchpad to screen pixels of display device 110. In another embodiment, touch control logic 624 may flip or invert one or more touchpad coordinates associated with a touch when mapping to display device 110 when touch input device 102 is upside down relative to display device 110. In still another embodiment, touch control logic 624 may scale touchpad coordinates for a direct touch to map the touchpad accordance to the portion of the screen of display device 110 covered by an visible through touch input device 102. In this manner, processor(s) 604 for one embodiment may execute any suitable software responsive to touch input device 102 to correspond with touch inputs to touch input device 102.

Operation of Touch Input Device

Figure 7:
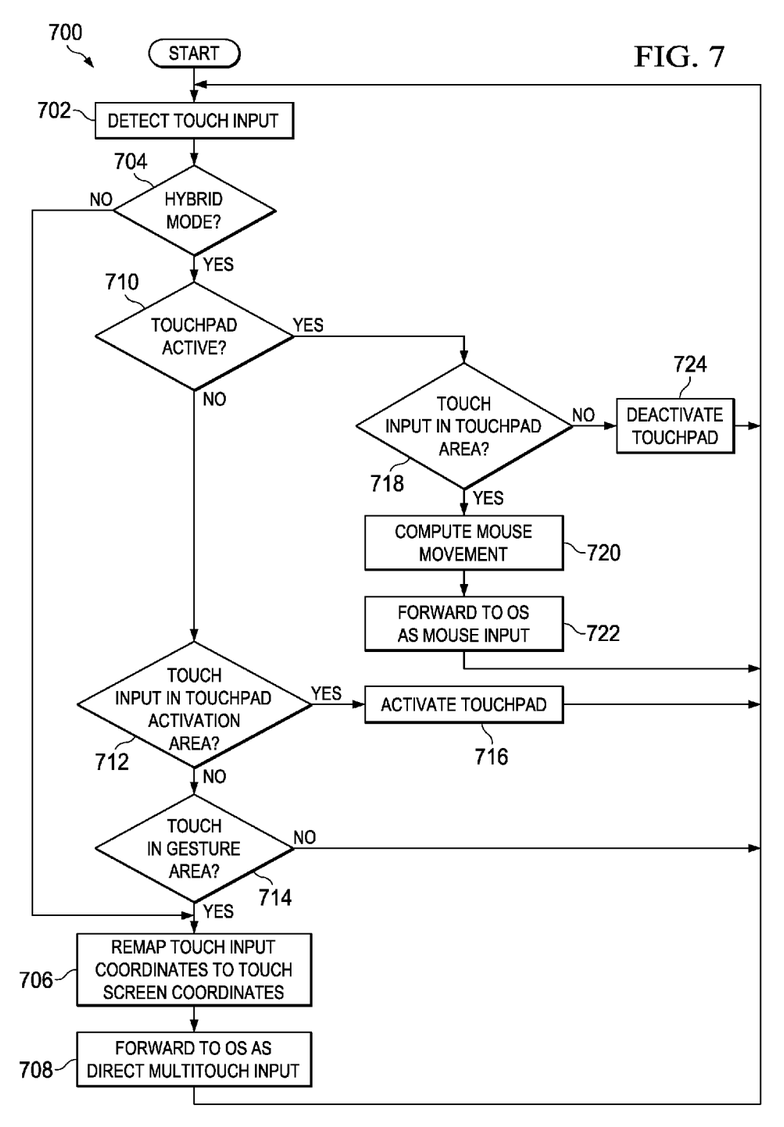
FIG. 7 illustrates, for one embodiment, an example flow diagram to perform an operation of mapping a touch input across the first touch surface and/or the second touch surface of the touch input device to the display device of the electronic device.

FIG. 7 illustrates, for one embodiment, an example flow diagram 700 to perform an operation of mapping a touch input across first touch surface layer 116 and/or second touch surface layer 118 of touch input device 102 to display device 110 of electronic device 100. In one or more embodiments, the operations of FIG. 7 are performed by one or more of touch input device 102, touch control logic 624 system control logic 606, processor(s) 604, software 626 and software 628. In block 702, a touch input is detected by touch sensor 120 of touch input device 102. The touch input may be detected by touch of either first touch surface layer 116 or second touch surface layer 118 by the user. In block 704, it is determined whether the current mode of electronic device 100 is a hybrid mode or touchscreen mode. In the hybrid mode, touches to touch input device 102 may be either for an indirect touchpad interaction or indirect touchscreen interaction. In one embodiment, indirect touchpad interactions are mapped to display device 110 as indirect cursor movements, and in the indirect touchscreen mode touches are mapped to display device 110 as gestures. In one embodiment, electronic device 100 is in hybrid mode when electronic device 100 is determined to be in an open configuration and in a direct touch touchscreen mode when electronic device 100 is determined to be in a closed configuration. In a particular embodiment, electronic device 100 is determined to be in an open or closed configuration as a result of a lid position signal generated by lid position sensor 616.

If it is determined in block 704 that electronic device 100 is not in the hybrid mode, electronic device 100 is determined to be in the direct touch touchscreen mode and the procedure continues to block 706. In block 706, touch input coordinates associated with a touch to second touch surface layer 118 are remapped to correspond to touchscreen coordinates on display 110. In a particular embodiment, a touch to second touch surface layer 118 is remapped to correspond to a touch of a portion of display device 110 directly underneath the touched portion of second touch surface layer 118. In one embodiment, touch control logic 624 may flip touchpad coordinates when mapping to display device 110 when electronic device 100 is in the direct touchscreen mode and touch input device 102 is upside down relative to display device 110. In still another embodiment, touch control logic 624 may scale touchpad coordinates for a direct touch to map touches to the touchpad to the portion of the screen of display device 110 covered by and visible through touch input device 102. In block 708, the remapped touch input coordinates are forwarded to an operating system of electronic device 100 as a direct touchscreen multitouch input to display device 110. After block 708, the procedure returns to block 702.

If it is determined in block 704, that electronic device 100 is in the hybrid mode, the procedure continues to block 710. In block 710, it is determined whether touchpad area 502 of first touch surface layer 116 is active. In one or more embodiments, touchpad area 502 is determined to be active if there has been a previous touch within touchpad activation area 504. If in block 710 touchpad area 502 is determined to not be active, the procedure continues to block 712 in which it is determined whether the current touch input is in touchpad activation area 504. If the current touch input is not in touchpad activation area 504, the procedure continues to block 714. In block 714, it is determined whether the current touch input is in a gesture activation area such as one or more of gesture area 506a and gesture area 506b of first touch surface layer 116. If it is determined in block 714 that the current touch input is not in gesture area 506a or gesture area 506b, the procedure returns to block 702. If it is determined in block 714 that the current touch input is in gesture area 506a or gesture area 506b, the procedure returns to block 706 in which the touch input coordinates of the current touch input within gesture area 506a or gesture area 506b is remapped to touchscreen coordinates and are forwarded to the operating system as direct multitouch touchscreen input to display device 110 as a gesture in block 708. In one or more embodiments, gesture touch inputs may include gestures for scrolling, flicking, or bringing up operating system menus. The procedure then returns to block 702.

If it is determined in block 712, that the current touch input is in touchpad activation area 504, the procedure continues to block 716 in which the touchpad is activated. In a particular embodiment, activating the touchpad includes activating the touchpad mode of electronic device 100. The procedure then returns to block 702.

If it is determined in block 710 that the touchpad is active, the procedure continues to block 718 in which it is determined whether the current touch input is in touchpad area 502. If it is determined in block 718 that the current touch input is in touchpad area 502, the procedure continues to block 720 in which a mouse movement is computed from the touch input. After block 720, the procedure continues to block 722. In block 722, the mouse movement is forwarded to the operating system as a mouse input, which may be used to move a mouse cursor within display device 110. The procedure then returns to block 702.

If it is determined in block 718 that the current touch input is not in touchpad area 502, the procedure continues to block 724. This is representative of the current touch input being a touch upon first touch surface layer 116, but not within a touchpad area 502, which is interpreted as a command from the user to deactivate the touchpad. In block 724, touchpad area 502 is deactivated and the procedure returns to block 702.

It should be understood that in some embodiments operations for blocks 702-724 may be performed in any suitable order and may overlap in time with any other suitable operation. In addition, in some embodiments certain of blocks 702-724 may be omitted or modified.

Operation of Power Management Controller

Figure 8:
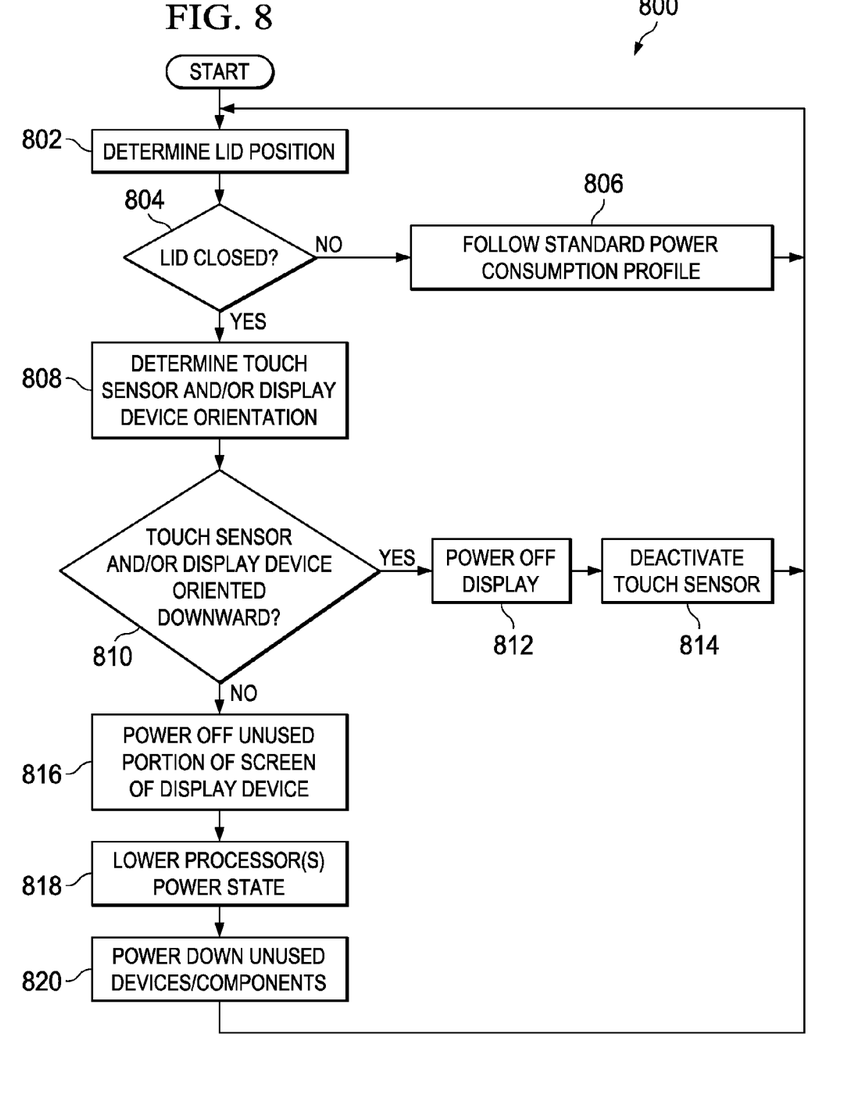
FIG. 8 illustrates, for one embodiment, an example flow diagram to perform an operation for power management by the power management controller of the electronic device.

FIG. 8 illustrates, for one embodiment, an example flow diagram 800 to perform an operation for power management by power management controller 618 of electronic device 100. In one or more embodiments, one or more of the operations of FIG. 8 are performed by power management logic 630.

In block 802, the lid position of electronic device 100 is determined. In one embodiment, the lid position is performed in response to a lid position signal generated by lid position sensor 616 indicative of the lid position of electronic device 100 in which a closed lid position is representative of electronic device 100 being in the closed configuration and an open lid position is representative of electronic device 100 being in the open configuration as previously described herein. In still other embodiments, electronic device 100 is configured to identify whether lower housing 104 and upper housing 112 are in the open configuration or the closed configuration. In block 804, it is determined whether the lid of electronic device 100 is closed.

If the lid is determined in block 804 to not be closed, the procedure continues to block 806. In block 806, power management logic 630 of power management controller 618 instructs electronic device 100 to follow a standard power consumption profile, which may include a power profile provided by the operating system of electronic device 100 such as a high performance, balanced, or power saving profile. The procedure then returns to block 802.

If the lid is determined in block 804 to be closed, procedure continues to block 808. In block 808, the physical orientation of touch sensor 120 and/or display device 110 is determined using an orientation signal provided by orientation sensor(s) 632. In block 810, power management logic 630 determines whether touch sensor 120 and/or display device 110 is oriented downward. The lid of electronic device 100 being closed and second touch surface layer 118 of touch sensor 120 and/or display device 110 being oriented downward is indicative of electronic device 100 being in a closed configuration and placed on a flat surface in which a user cannot interact with touch input device 102 or view display device 100 when electronic device 100 is in this configuration and orientation. In still other embodiments, power management controller 618 may turn off and/or reduce power to one or more of display device 110 and/or touch sensor 120 when one or more of touch input device 102 and/or display device 110 are identified as oriented in a predetermined direction.

If touch sensor 120 of touch input device 102 and/or display device 110 of electronic device 102 is determined in block 810 to be oriented downward, power management controller 618 powers off or reduce power to display device 110 in block 812. In block 814, power management controller 618 deactivates touch sensor 120. In one embodiment, other devices and/or components may also be placed in a reduced power consumption mode or turned off. The procedure then returns to block 802.

If touch sensor 120 of touch input device 102 and/or display device 110 of electronic device 102 is determined in block 810 to not be oriented downward, the procedure continues to block 816. In block 816, power management controller 618 powers off the unused portion of the screen of display device 110. The unused portion of the screen of display device 110 is the portion of the screen of display device 110 that is not visible through the transparent portion of touch input device 102 when electronic device 100 is in the closed configuration. In one embodiment, power management controller 618 may power off a backlight associated with unused portion of the screen of display device 110. In block 818, power management controller 618 instructs one or more of processor(s) 604 to transition to a lower power state because less computing power may be required in this configuration. In block 820, power management controller 618 shuts down one or more additional devices or components that are unused when electronic device 100 is in a closed configuration. For example, in one embodiment in block 820 power management controller 618 may shut down power to keyboard 108 in the closed configuration as keyboard 108 is no longer accessible in this configuration. The procedure then returns to block 802.

It should be understood that in some embodiments operations for blocks 802-820 may be performed in any suitable order and may overlap in time with any other suitable operation. In addition, in some embodiments certain of blocks 802-802 may be omitted or modified.

Various embodiments described herein allow a user to use electronic device 100, such as a notebook computer, while in movement or when standing. Various embodiments allow a user to use electronic device 100 while a lid of electronic device 100 is closed so that the user may use electronic device 100 while being carried. Various embodiments allow a user to view active content while the lid of electronic device 100 is closed by reformatting the content to fit the smaller screen viewable through transparent touch input device 102.

In the foregoing description, example embodiments have been described. Various modifications and changes may be made to such embodiments without departing from the scope of the appended claims. The description and drawings are, accordingly, to be regarded in an illustrative rather than a restrictive sense.

What is claimed is:

1. An apparatus, comprising:
   a first housing;
   a second housing coupled to the first housing, the first housing and the second housing being rotatable between an open configuration and a closed configuration;
   a lid position sensor configured to provide a lid position signal indicative of the first housing and second housing being in either the open configuration or the closed configuration;
   a touch input device supported by the first housing, the touch input device including:
      a first touch surface layer;
      a second touch surface layer; and
      a touch sensor disposed between the first touch surface layer and the second touch surface layer, the same touch sensor being configured to detect both a first touch input associated with the first touch surface layer and a second touch input associated with the second touch surface layer;

a display device supported by the second housing, wherein the touch input device is configured such that a portion of the display device is visible through the touch input device when the first housing and the second housing are in the closed configuration;

an orientation sensor configured to provide an orientation signal indicative of an orientation of the touch sensor; and logic configured to receive the orientation signal from the orientation sensor and the lid position signal from the lid position sensor, and deactivate the touch sensor based upon the lid position signal being indicative of the first housing and the second housing being in the closed configuration and the orientation signal being indicative of the touch sensor being in a downward facing orientation, wherein the logic is further configured to power off a portion of the display device that is not visible through the touch input device responsive to the lid position signal being indicative of the first housing and the second housing being in the closed configuration and the orientation sensor being indicative of the touch sensor not being in a downward facing orientation.

2. The apparatus of claim 1, wherein the first touch surface layer and the second touch surface layer has an at least partially transparent material.

3. The apparatus of claim 2, wherein the at least partially transparent material includes one or more of glass and plastic.

4. The apparatus of claim 1, wherein the touch input device is positioned in proximity to the display device when the first housing and second housing are in the closed configuration.

5. The apparatus of claim 1, further comprising:
logic configured to identify whether the first housing and the second housing are in the open configuration or the closed configuration.

6. The apparatus of claim 1, wherein the logic is further configured to map the second touch input associated with the second touch surface layer to a display device as a touchscreen interaction.

7. The apparatus of claim 1, wherein the logic is further configured to map the first touch input associated with the first touch surface layer to a display device as a touchpad interaction.

8. The apparatus of claim 1, wherein the apparatus comprises a notebook computer.

9. An apparatus, comprising:
first logic configured to receive one or more signals associated with touch input from a touch sensor associated with an electronic device, the touch sensor disposed between a first touch surface layer and a second touch surface layer, the same touch sensor being configured to detect both a first touch input associated with the first touch surface layer and a second touch input associated with the second touch surface layer;

second logic configured to map touch input to a display device associated with the electronic device;

a lid position sensor configured to provide a lid position signal indicative of the electronic device being in either an open configuration or a closed configuration, wherein the touch sensor is configured such that a portion of the display device is visible through the touch sensor when the electronic device is in the closed configuration;

an orientation sensor configured to provide an orientation signal indicative of an orientation of the touch sensor; and third logic configured to receive the orientation signal from the orientation sensor and the lid position signal from the lid position sensor, and deactivate the touch sensor based upon the lid position signal being indicative of the electronic device being in the closed configuration and the orientation signal being indicative of the touch sensor being in a downward facing orientation, wherein the third logic is further configured to power off a portion of the display device that is not visible through the touch sensor responsive to the lid position signal being indicative of the electronic device being in the closed configuration and the orientation sensor being indicative of the touch sensor not being in a downward facing orientation.

10. The apparatus of claim 9, wherein the second logic is configured to ma touch input to the display device based upon whether the electronic device is in an open configuration or a closed configuration.

11. The apparatus of claim 10, further comprising fourth logic configured to identify whether the electronic device is in the open configuration or the closed configuration.

12. The apparatus of claim 11, further comprising fifth logic configured to reduce power to a portion of the display device if the electronic device is in the closed configuration.

13. The apparatus of claim 9, wherein the first touch surface layer and the second touch surface layer has an at least partially transparent material.

14. The apparatus of claim 13, wherein the at least partially transparent material includes one or more of glass and plastic.

15. The apparatus of claim 9, further comprising:
wherein the second logic is configured to map the second touch input associated with the second touch surface layer to the display device as a touchscreen interaction.

16. The apparatus of claim 15, wherein the second touch input has touchpad coordinates associated therewith, and wherein the second logic is configured to map the second touch input to the display device by inverting the touchpad coordinates associated with the second touch input.

17. The apparatus of claim 9, wherein the second logic is configured to map the first touch input associated with the first touch surface layer to the display device as a touchpad interaction.

18. The apparatus of claim 9, further comprising:
logic configured to determine whether the first touch input is associated with a touchpad activation area of the first touch surface layer; and
logic configured to activate a touchpad mode of the electronic device if the touch input is associated with the touchpad activation area.

19. The apparatus of claim 9, further comprising:
logic configured to determine whether the first touch input is associated with a gesture area of the first touch surface layer; and
logic configured to map the first touch input to the display device as a gesture if the touch input is associated with the gesture area.

20. The apparatus of claim 9, further comprising:
logic configured to reduce power to one or more of the touch sensor and a portion of the display device.

21. The apparatus of claim 20, further comprising:
logic configured to determine whether one or more of the display device and the touch sensor are oriented in a predetermined direction; and
logic configured to reduce power to one or more of the display device and the touch sensor if one or more of the display device and the touch sensor are oriented in the predetermined direction.

22. A method, comprising:
receiving one or more signals associated with touch input from a touch sensor associated with an electronic device, the touch sensor disposed between a first touch surface layer and a second touch surface layer, the same touch sensor being configured to detect both a first touch input associated with the first touch surface layer and a second touch input associated with the second touch surface layer;

mapping touch input to a display device associated with the electronic device;

receiving a lid position signal indicative of the electronic device being in either an open configuration or a closed configuration, wherein the touch sensor is configured such that a portion of the display device is visible through the touch sensor when the electronic device is in the closed configuration;

receiving an orientation signal indicative of an orientation of the touch sensor;

deactivating the touch sensor based upon the lid position signal being indicative of the electronic device being in the closed configuration and the orientation signal being indicative of the touch sensor being in a downward facing orientation; and powering off a portion of the display device that is not visible through the touch sensor responsive to the lid position signal being indicative of the electronic device being in the closed configuration and the orientation sensor being indicative of the touch sensor not being in a downward facing orientation.

23. The method of claim 22, wherein mapping touch input to the display device is based upon whether the electronic device is in an open configuration or a closed configuration.

24. The method of claim 23, further comprising identifying whether the electronic device is in the open configuration or the closed configuration.

25. The method of claim 22, wherein the first touch surface layer and the second touch surface layer has an at least partially transparent material.

26. The method of claim 25, wherein the at least partially transparent material includes one or more of glass and plastic.

27. The method of claim 22, comprising:
mapping the second touch input associated with the second touch surface layer to the display device as a touchscreen interaction.

28. The method of claim 27, wherein the second touch input has touchpad coordinates associated therewith, and wherein mapping the second touch input to the display device includes inverting the touchpad coordinates associated with the second touch input.

29. The method of claim 22, comprising:
mapping the first touch input associated with the first touch surface layer to the display device as a touchpad interaction.

* * * * *

UNITED STATES PATENT AND TRADEMARK OFFICE
CERTIFICATE OF CORRECTION

PATENT NO. : 9,292,114 B2  
APPLICATION NO. : 13/485633  
DATED : March 22, 2016  
INVENTOR(S) : Peter S Adamson et al.

Page 1 of 1

It is certified that error appears in the above-identified patent and that said Letters Patent is hereby corrected as shown below:

In the Claims

In column 16, line 12, in claim 10, delete "ma" and insert -- map --, therefor.

Signed and Sealed this
Second Day of August, 2016

Michelle K. Lee
*Director of the United States Patent and Trademark Office*